UNITED STATES PATENT OFFICE.

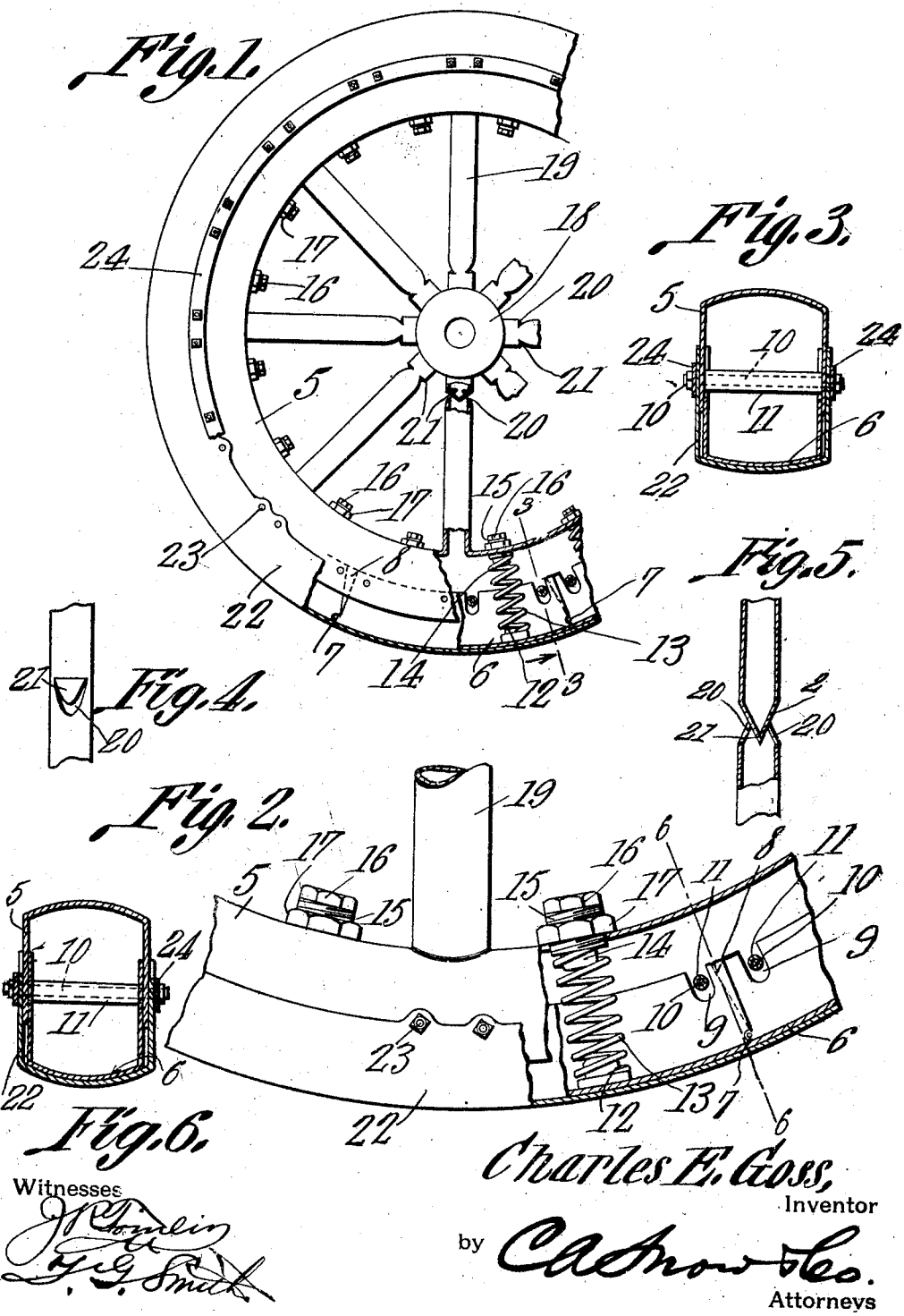

CHARLES E. GOSS, OF ROBERT LEE, TEXAS.

VEHICLE-WHEEL.

1,006,650.   Specification of Letters Patent.   Patented Oct. 24, 1911.

Application filed July 21, 1910. Serial No. 573,066.

*To all whom it may concern:*

Be it known that I, CHARLES E. GOSS, a citizen of the United States, residing at Robert Lee, in the county of Coke and State of Texas, have invented a new and useful Vehicle-Wheel, of which the following is a specification.

It is the object of the present invention to provide an improved construction of vehicle wheel and the invention relates more particularly to that class of such wheels which are designed to obviate the employment of pneumatic tires and yet secure all of the advantages which would accrue from the use of such tires.

One of the primary aims of the invention is to so construct the wheel that its resiliency may be adjusted in the same manner that the resiliency of a pneumatic tire may be adjusted by inflating it to a greater or less degree.

It is a further object of the invention to provide against accumulation of mud or dust between the rims of the wheel so that the resiliency of the springs interposed between the rims will not be impaired.

With the above and other objects in view, the invention consists in the general construction and arrangement of parts shown in the accompanying drawings, in which, Figure 1 is a view partly in side elevation and partly in section of a wheel constructed in accordance with the present invention. Fig. 2 is a detail view similar to Fig. 1. Fig. 3 is a sectional view on the line 3—3 of Fig. 1. Figs. 4 and 5 are detail views of the inner end of one of the spokes of the wheel. Fig. 6 is a detail section taken on line 6—6 of Fig. 2.

In the drawings, the wheel is illustrated as embodying, among other elements, an inner rim which is indicated by the numeral 5 and is preferably formed of stout sheet metal bent up to channel form with a circumferential concavity throughout the entire extent of the inner rim. Fitted to the inner rim is an outer rim which is made up of a plurality of sections indicated by the numeral 6 and hingedly connected as at 7, at their ends, in a continuous or annular series. It will be observed that, in cross section, the inner rim is of U-shape as are the sections of the outer rim and that the connecting or bottom walls of the sections of the outer rim are hinged at their ends and in order that the several sections may have relative movement upon their hinge connections, one end of each section is off-set as indicated by the numeral 8. Each section of the outer rim is formed, in its side wall, with a plurality of notches indicated by the numeral 9 and bolts 10 are secured through the side walls of the inner rim 5 and have fitted upon them, rotatively, sleeves 11, the said bolts and their sleeves engaging in corresponding notches in the said side wall of the sections of the outer rim to retain the outer rim for rotation with the inner rim. Each section of the outer rim is formed, at a point midway between its ends, with an inwardly projecting stud 12 upon the inner face of its bottom wall and a spring 13 is fitted at one end over this stud and at its other end over a stud 14 formed upon a tension adjusting screw 15 which at its end opposite the end provided with the stud 14, is squared as at 16 for the engagement therewith of a wrench or other suitable implement to be employed in turning the screw. The several screws 15 are threaded through openings in the connecting wall of the inner rim and it will be readily understood that by adjusting these screws, the tension of the corresponding springs may be varied as desired. In order to hold these screws 15 in adjustment, jam nuts indicated by the numeral 17 are threaded upon these screws and bear against the outer side of the connecting wall of the inner rim. It will be readily understood at this point that the resiliency of the spring may be varied so as to render the wheel as a whole, more or less yieldable and that thus, the same effects can be produced by adjusting these screws 15 as by inflating to a greater or less degree the ordinary pneumatic tires now in use upon wheels of this type.

The hub of the wheel is indicated by the numeral 18 and the spokes connecting the hub and inner rim by the numeral 19, these spokes being tubular and opening into the hub and also into the concavity of the said inner rim. It will be observed that each of the spokes 19, near its inner end, is formed with an opening 20 and that the material which is struck up to afford this opening is bent in to afford a deflector wing 21 closing the inner end of the spoke and preventing mud and other accumulations which may find their way into the space between the inner and outer rims, falling through the spoke and into the hub but deflecting such accumulations through the opening 20.

A covering or sheat 22 of any suitable material is fitted over the sections of the outer rim and secured by bolts 23, at its edges, to the inner rim, there being a ring 24 fitted over the said edges and held in place by the said bolts 23.

What is claimed is:—

1. In a vehicle wheel, an inner rim of channel formation, an outer rim of channel formation fitting the inner rim, springs interposed between the rims, a hub, and spokes connecting the hub and inner rim, the spokes being hollow and opening through the inner rim, the material of the spoke being struck back throughout a definite area to form an opening and such area of material serving to close the inner end of the spoke and serve as a deflector.

2. In a wheel, a hub, spokes, an inner rim supported by the spokes and of channel formation, an outer rim comprising a plurality of sections of channel formation and disposed end to end in an annular series, the connecting portions of the said sections being hingedly connected, the side portions of each section at one end being laterally offset and overlapping the corresponding portions of the next adjacent section, the side portions of the sections at their ends being notched, bolts extending transversely of the inner rim and engaging in the notches in the sides of the said sections, and springs interposed between the inner rim and the sections of the outer rim.

In testimony that I claim the foregoing as my own, I have hereto affixed my signature in the presence of two witnesses.

CHARLES E. GOSS.

Witnesses:
  Mrs. J. S. GARDNER,
  T. JOHNSON.